(12) United States Patent
Lee et al.

(10) Patent No.: US 12,294,571 B2
(45) Date of Patent: May 6, 2025

(54) APPARATUS FOR MANAGING QUANTUM KEY AND METHOD OF OPERATING SAME

(71) Applicant: KOREA INSTITUTE OF SCIENCE & TECHNOLOGY INFORMATION, Daejeon (KR)

(72) Inventors: Chan Kyun Lee, Daejeon (KR); Yong Hwan Kim, Daejeon (KR); Kyu Seok Shim, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 0 days.

(21) Appl. No.: 17/911,299

(22) PCT Filed: Feb. 4, 2022

(86) PCT No.: PCT/KR2022/001770
§ 371 (c)(1),
(2) Date: Sep. 13, 2022

(87) PCT Pub. No.: WO2023/080344
PCT Pub. Date: May 11, 2023

(65) Prior Publication Data
US 2024/0297869 A1     Sep. 5, 2024

(30) Foreign Application Priority Data

Nov. 8, 2021 (KR) .................. 10-2021-0152378

(51) Int. Cl.
*H04L 9/40* (2022.01)
*H04L 9/08* (2006.01)

(52) U.S. Cl.
CPC ........ *H04L 63/0428* (2013.01); *H04L 9/0852* (2013.01)

(58) Field of Classification Search
CPC .......................... H04L 63/04; H04L 63/0428
See application file for complete search history.

(56) References Cited

U.S. PATENT DOCUMENTS

| 9,692,595 B2 | 6/2017 | Lowans et al. | |
| 2016/0197723 A1* | 7/2016 | Takahashi | G06F 11/0709 380/255 |

(Continued)

FOREIGN PATENT DOCUMENTS

| CN | 103001875 | 3/2013 |
| CN | 109962774 | 7/2019 |
| CN | 111355655 | 6/2020 |

(Continued)

OTHER PUBLICATIONS

Lei Shi, et al., "Research on quantum key network model", 2017.

(Continued)

*Primary Examiner* — D'Arcy Winston Straub
(74) *Attorney, Agent, or Firm* — KED & ASSOCIATES, LLP (57) ABSTRACT

Disclosed are an apparatus for managing quantum keys and a method of operating the same to rapidly and flexibly provide quantum keys for network services by effectively and efficiently distributing quantum keys in a quantum-secured network.

10 Claims, 4 Drawing Sheets

(56) References Cited

U.S. PATENT DOCUMENTS

| | | | |
|---|---|---|---|
| 2021/0044432 A1* | 2/2021 | Li | H04L 9/0852 |
| 2023/0034274 A1* | 2/2023 | M T | H04L 9/14 |

FOREIGN PATENT DOCUMENTS

| | | |
|---|---|---|
| JP | 2008-306633 | 12/2008 |
| JP | 2010-286978 | 12/2010 |
| JP | 2013-544479 | 12/2013 |
| JP | 2018-502514 | 1/2018 |
| JP | 2020-501413 | 1/2020 |
| KR | 10-2017-0115055 | 10/2017 |
| KR | 10-2019-0073520 | 6/2019 |
| WO | WO 2021/025749 | 2/2021 |
| WO | WO 2021/054693 | 3/2021 |

OTHER PUBLICATIONS

Yuan Cao, et al. "Key on demand (KoD) for software-defined optical networks secured by quantum key distribution (QKD)", Oct. 16, 2017.

Japanese Office Action dated Dec. 26, 2023 issued in Application No. 2022-555960.

* cited by examiner

[quantum key management device]

APPARATUS FOR MANAGING QUANTUM KEY AND METHOD OF OPERATING SAME

CROSS-REFERENCE TO RELATED PATENT APPLICATIONS

This application is a U.S. National Stage Application under 35 U.S.C. § 371 of PCT Application No. PCT/KR2022/001770, filed Feb. 4, 2022, which claims priority to Korean Patent Application No. 10-2021-0152378, filed Nov. 8, 2021, whose entire disclosures are hereby incorporated by reference.

TECHNICAL FIELD

The disclosure relates to a method of effectively and efficiently distributing quantum keys in a quantum-secured network to rapidly and flexibly provide quantum keys for a network service.

BACKGROUND ART

A quantum-secured network is the necessary network structure for future digital security and corresponds to a security technology sharing a quantum key completely safe from wiretapping and using the same as a network service key.

In the quantum-secured network, the network performance may be limited according to a quantum key generation rate of a quantum key distribution node device, and particularly, there is a disadvantage of further reducing the quantum key generation rate as a distance between nodes is increased.

Accordingly, a method of reproducing an optimal quantum key under limited quantum key resources is an important issue that influences the performance of a quantum-secured network, but the research and development of a method and a system for transmitting a key in the current quantum key distribution field has not yet been widely conducted.

DISCLOSURE OF INVENTION

Technical Problem

The disclosure has been mode to solve the problem, and an aspect of the disclosure is to propose a new method of rapidly and flexibly providing quantum keys for network services by effectively and efficiently distributing quantum keys in a quantum-secured network.

Solution to Problem

An apparatus for managing quantum keys according to an embodiment of the disclosure to achieve the aspect includes an identification unit configured to, when quantum key management system nodes located in a quantum key management network layer of a quantum-secured network are indexed, identify information on a number of quantum keys between the indexed quantum key management system nodes and a search unit configured to search for node paths corresponding to sequence of quantum key management system nodes for reproducing adjacent quantum keys in order to generate a non-adjacent quantum key between quantum key management system nodes designated as a start node and a destination node in the quantum-secured network, based on the information on the number of quantum keys.

Specifically, the identification unit may be configured to further identify network information including at least one of network topology information of the quantum-secured network, a quantum key generation rate, and a service key request rate, and the search unit is configured to search for node paths, based on the information on the number of quantum keys and the network information.

Specifically, the search unit may be configured to, when the start node and the destination node are designated according to a service request in the quantum-secured network, search for as many node paths between the start node and the destination node as a first threshold number.

Specifically, the apparatus may further include a controller configured to perform control to generate a non-adjacent quantum key through a specific node path in which a number of adjacent quantum keys identified as a minimum value is largest in each node and the number of adjacent quantum keys identified as the minimum value is larger than a second threshold number among the found node paths corresponding to the first threshold number.

Specifically, the search unit may be configured to, when a non-adjacent quantum key is generated in advance before a service request in the quantum-secured network, search for a specific node path in which a number of adjacent quantum keys between an intermediate node and the destination node is larger than a number of adjacent quantum keys between the start node and the destination node and a difference between the numbers is largest among path nodes designated for the start node, the destination node, and the intermediate node between the start node and the destination node.

Specifically, the apparatus may further include a controller configured to perform control to consume one adjacent quantum key between the start node and the intermediate node and one adjacent quantum key between the intermediate node and the destination node to generate a non-adjacent quantum key between the start node and the destination node in at least one case in which the number of adjacent quantum keys between the destination node and the intermediate node is larger than a sum of the number of adjacent quantum keys between the start node and the destination node and a third threshold number and the number of adjacent quantum keys between the intermediate node and the destination node is larger than a sum of the number of adjacent quantum keys between the start node and the destination node and a fourth threshold number.

A method of operating a quantum key management device according to an embodiment of the disclosure to achieve the aspect includes an identification operation of, when quantum key management system nodes located in a quantum key management network layer of a quantum-secured network are indexed, identifying information on a number of quantum keys between the indexed quantum key management system nodes and a search operation of searching for node paths corresponding to sequence of quantum key management system nodes for reproducing adjacent quantum keys in order to generate a non-adjacent quantum key between quantum key management system nodes designated as a start node and a destination node in the quantum-secured network, based on the information on the number of quantum keys.

Specifically, the identification operation may further include identifying network information including at least one of network topology information of the quantum-secured network, a quantum key generation rate, and a service key request rate, and the search operation includes searching for node paths, based on the information on the number of quantum keys and the network information.

Specifically, the search operation may include, when the start node and the destination node are designated according to a service request in the quantum-secured network, searching for as many node paths between the start node and the destination node as a first threshold number.

Specifically, the method may further include a control operation of performing control to generate a non-adjacent quantum key through a specific node path in which a number of adjacent quantum keys identified as a minimum value is largest in each node and the number of adjacent quantum keys identified as the minimum value is larger than a second threshold number among the found node paths corresponding to the first threshold number.

Specifically, the search operation may include, when a non-adjacent quantum key is generated in advance before a service request in the quantum-secured network, searching for a specific node path in which a number of adjacent quantum keys between an intermediate node and the destination node is larger than a number of adjacent quantum keys between the start node and the destination node and a difference between the numbers is largest among path nodes designated for the start node, the destination node, and the intermediate node between the start node and the destination node.

Specifically, the method may further include a control operation of performing control to consume one adjacent quantum key between the start node and the intermediate node and one adjacent quantum key between the intermediate node and the destination node to generate a non-adjacent quantum key between the start node and the destination node in at least one case in which the number of adjacent quantum keys between the destination node and the intermediate node is larger than a sum of the number of adjacent quantum keys between the start node and the destination node and a third threshold number and the number of adjacent quantum keys between the intermediate node and the destination node is larger than a sum of the number of adjacent quantum keys between the start node and the destination node and a fourth threshold number.

Advantageous Effects of Invention

Accordingly, a quantum key management device and a method of operating the same according to the disclosure can efficiently and effectively generate service keys in a limited quantum key resource condition by transmitting and reproducing quantum keys with reference to information of only neighbor nodes of a specific node without reference to quantum key resource information of all nodes during a quantum key relay process, thereby achieving a network service at a very high security level.

BEST MODE FOR CARRYING OUT THE INVENTION

Hereinafter, exemplary embodiments of the present disclosure will be described with reference to the accompanying drawings.

An embodiment of the disclosure handles a quantum key distribution encryption technology which is an encryption system using a physical characteristic of quantum.

A quantum-secured network to which the quantum key distribution encryption includes a quantum key distribution layer for generating a quantum key between adjacent nodes, a quantum key management network layer for receiving the quantum key from the quantum key distribution layer and transmitting and reconfiguring adjacent quantum keys, and a service layer for receiving a service key form the quantum key network layer and configuring a safe service.

The quantum key distribution layer may generate only a quantum key between physically adjacent nodes but a service request is made between all nodes, and thus the quantum management network layer may be required to reproduce a quantum key between non-adjacent nodes.

To this end, a method of consuming quantum keys between adjacent nodes and reproducing the same in a relay type may be used.

However, a method of reproducing an optimal quantum key under limited quantum key resources is an important issue that influences the performance of a quantum-secured network, but the research and development of a method and a system for transmitting a key in the current quantum key distribution field has not yet widely conducted.

Accordingly, an embodiment of the disclosure proposes a new method of effectively and efficiently distributing quantum keys in a quantum-secured network and rapidly and flexibly providing quantum keys for network services.

Figure 1:
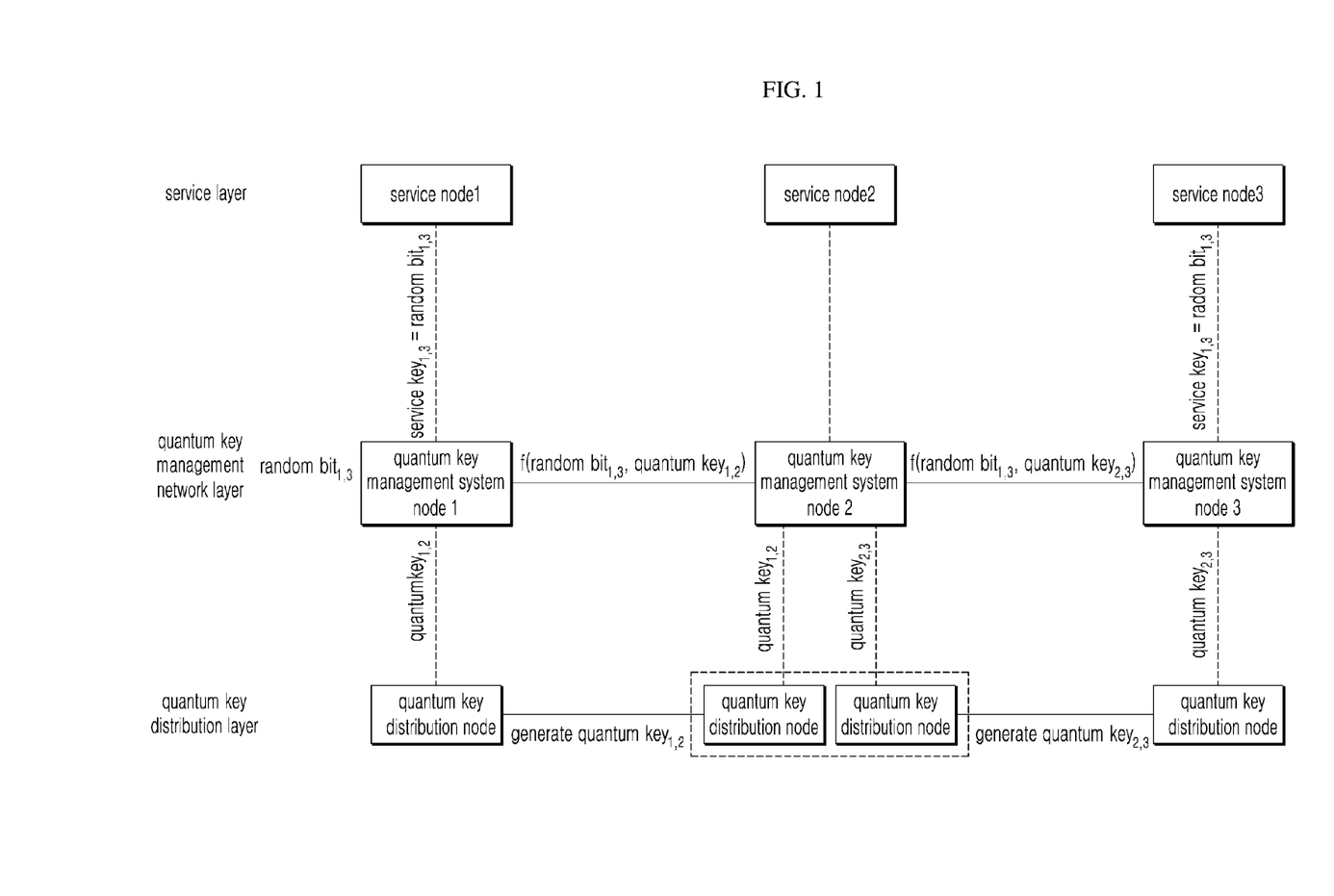
FIG. 1 illustrates an example of a quantum-secured network according to an embodiment of the disclosure.

In connection with this, FIG. 1 illustrates an example of a quantum-secured network according to an embodiment of the disclosure.

As illustrated in FIG. 1, the quantum-secured network includes a quantum key distribution layer for generating a quantum key (hereinafter, adjacent quantum key) between adjacent nodes in physical topology, a quantum key management network layer for receiving the adjacent quantum key from the quantum key distribution layer, managing/relaying/reproducing the quantum key, and transferring the quantum key to a service layer, and the service layer for receiving a service key between end-to-end nodes from the quantum key management network layer and constructing a safe network service.

To this end, a quantum key distribution node (QKD node) is installed in the quantum key distribution layer, a quantum key management system node (QKMS node) is installed in the quantum key management network layer, and a service node is installed in the service layer.

In one physical area, the quantum key distribution node, the quantum key management system node, and the service node may be connected to each other through a short interface in one server rack.

Further, the quantum key distribution node may be connected to a neighbor quantum key distribution node through an optical fiber to generate a quantum key, and the quantum key management system node may be connected to a neighbor quantum key management system node through Ethernet to manage/relay/reproduce a quantum key.

In physical topology, quantum key distribution node may be installed in each of both ends of all links.

That is, node 2 having two neighbor nodes may include a quantum key distribution node for each of the neighbor nodes, and the quantum key management system node and the service node may include one quantum key distribution node regardless of the number of neighbor nodes.

Meanwhile, in the configuration of the quantum-secured network, in order to generate the service key between nodes 1 and 3, quantum key management system node 1 may generate a random bit, encode the random bit with adjacent quantum key1, 2, and then transmit the same to quantum key management system node 2.

Quantum key management system node 2 may decode the received random bit by using adjacent quantum key1, 2, encode the random bit again with adjacent quantum key2, 3, and transmit the same to quantum key management system node 3.

Quantum key management system node 3 may decode the corresponding random bit by using adjacent quantum key2, 3, and share service keys between nodes 1 and 3 by using the same.

At this time, XOR operation may be used for encoding and decoding methods in respective nodes.

As described above, in order to generate non-adjacent quantum keys between nodes 1 and 3, it is required to consume a plurality of adjacent quantum keys to reproduce quantum keys.

Accordingly, an embodiment of the disclosure is to propose a method of stably supporting service keys by guaranteeing the number of all end-to-end quantum keys at a predetermined level or higher, and hereinafter a configuration of a quantum key management device (not shown) to implement the same is described.

The quantum key management device (not shown) basically corresponds to a separate controller (for example, Q controller) configured to management and control the quantum key management system node located in the quantum key management network layer, but the disclosure is not limited thereto, and the quantum key management device may correspond to each of a master node designated as one of quantum key management system nodes located in the quantum key management network layer or each of the quantum key management system nodes.

Figure 2:
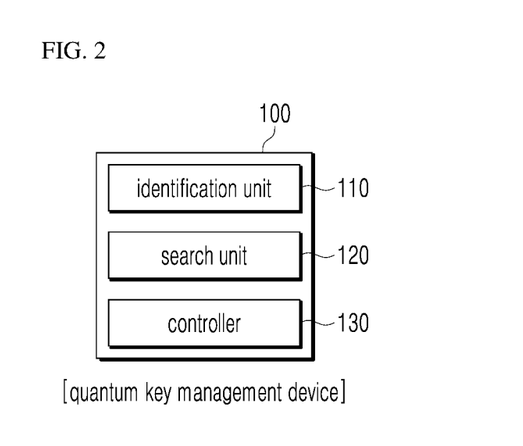
FIG. 2 is a block diagram illustrating a configuration of a quantum key management device according to an embodiment of the disclosure.

In connection with this, FIG. 2 illustrates a schematic configuration of a quantum key management device 100 according to an embodiment of the disclosure.

As illustrated in FIG. 2, the quantum key management device 100 according to an embodiment of the disclosure may include an identification unit 110 configured to identify information on the number of quantum keys and a search unit 120 configured to search for node paths corresponding to the sequence of quantum key management system nodes.

Further, the quantum key management device 100 according to an embodiment of the disclosure may further include a controller 130 configured to control reproduction of quantum keys as well as the above-described configuration.

All elements or at least some elements of the quantum key management device 100 including the identification unit 110, the search unit 120, and the controller 130 may be implemented in a hardware module form or a software module form or may be implemented in the form of a combination of a hardware module or a software module.

The software module may be understood as, for example, an instruction executed by a processor configured to control calculations within the quantum key management device 100, and the instruction may have the form installed in a memory within the quantum key management device 100.

The quantum key management device 100 according to an embodiment of the disclosure may rapidly and flexibly provide quantum keys for network services by effectively and efficiently distributing quantum keys in the quantum-secured network through the above-described configuration, and hereinafter the configuration within the quantum key management device 100 for implementing the same is subsequently described in more detail.

Meanwhile, in an embodiment of the disclosure, methods of generating quantum keys for service keys may be divided into a response type quantum key transmission method of, only when there is a service request in the quantum-secured network, generating quantum keys therefor and a preparation type quantum key transmission method of, even when there is no service request, generating in advance keys.

Hereinafter, the response type quantum key transmission method and the preparation type quantum key transmission method may be separately described.

First, each element within the quantum key management device 100 according to the response type quantum key transmission method is described below.

The identification unit 110 performs a function of identifying information on the number of quantum keys of the quantum-secured network.

More specifically, when quantum key management system nodes located in the quantum key management network layer of the quantum-secured network are indexed, the identification unit 110 identifies information on the number of adjacent quantum keys between the indexed quantum key management system nodes.

In connection with this, it may be assumed that the total number of quantum key management system nodes located in the quantum key management network layer is N.

In this case, the identification unit 110 first indexes quantum key management system nodes 1 to N of the network and generate a quantum key information matrix G to store information on the number of quantum keys between the indexed quantum key management system nodes.

A predetermined element $G(i, j)$ of the matrix indicates the number of adjacent quantum keys between a quantum key management system node i and a quantum key management system node j.

Since the quantum key has bidirectionality, G is a symmetric matrix and, that is, $G(i, j)$ and $G(j, i)$ have the same value.

Accordingly, when the total number of quantum key management system nodes is N, the size of G is N×N.

Meanwhile, the identification unit 110 may identify not only the information on the number of quantum keys for the quantum-secured network but also network information.

Here, the network may include at least one of network topology information of the network, a quantum key generation rate, and a service key request rate.

For reference, the network information is a variable which should be considered for searching for a node path and may be understood to reflect physical network information of the quantum-secured network, whether there is network failure, and a degree of a quantum key request and a degree of a service key between pairs of nodes.

The search unit 120 performs a function of searching for node paths corresponding to the sequence of quantum key management system nodes.

More specifically, the search unit 120 searches for node paths corresponding to the sequence of quantum key management system nodes for reproducing adjacent quantum keys in order to generate non-adjacent quantum keys between quantum key management system nodes designated as a start node (s) and a destination node (d) in the quantum-secured network.

At this time, when the start node (s) and the destination node (d) are designated according to a service request in the quantum-secured network, the search unit 120 may search for node paths between the start node (s) and the destination node (d) as many as a first threshold number (Thr1).

Each of the found node paths is configured by the sequence of nodes starting at the start node (s) and ending at the destination node (d), and consecutive nodes within the sequence are adjacent nodes in the physical network and thus may match adjacent key information sequence corresponding to each thereof.

For example, when an nth node path Ps,d between the start node (s) and the destination node (d) is found as {s, b, c, d}, an adjacent key information sequence Ks,d(n) corresponding to the node path may be calculated (identified) as {G(s,b), G(b,c), G(c,d)}.

Meanwhile, when not only the information on the number of quantum keys but also the network information is identified from the quantum-secured network, the search unit 120 may search for node paths by additionally reflecting physical network information of the quantum-secured network, whether there is network failure, and a degree of a quantum key request and a degree of a service key request between pairs of nodes from the network information.

The controller 130 performs a function of controlling the generation of quantum keys.

More specifically, when as many node paths between the start node (s) and the destination node (d) as the first threshold number (Thr1) are fond, the controller 130 selects a specific node path required to generate an adjacent quantum key from among the found node paths and control the generation of the quantum keys.

In connection with this, from among the found node paths corresponding to the first threshold number (Thr1), the controller 130 selects a specific node path in which the number of adjacent quantum keys identified as the minimum value is largest in each node and the number of adjacent quantum keys identified as the minimum value is larger than the second threshold number (Thr2).

The process may be expressed as shown in [Equation 1] below.

$$n^* = \arg\max_{n}[\min\{K_{s,d}(n)\}] \qquad \text{[Equation 1]}$$

Here, min[K] is a function of calculating an element having a minimum value among elements of sequence K.

When a value of min{Ks,d(n*)} is larger than the second threshold number (Thr2), a non-adjacent quantum key between the start node (s) and the destination node (d) is relayed through node paths belonging to Ps,d(n*).

That is, it is possible to generate one non-adjacent key between the start node (s) and the destination node (d) by consuming adjacent quantum keys included in Ks,d(n*) one by one.

Meanwhile, the first threshold number (Thr1) which is the search reference of node paths is related to the system performance, and when a value thereof is configured to be small, the system load due to the search for node paths may be reduced and thus the system performance can be improved. The second threshold number (Thr2) which is the selection reference of node paths is related to the system safety, and when there are sufficient quantum keys available in the node paths, a value thereof may be configured to be large.

The description of the response type quantum key transmission method has finished and each element within the quantum key management device 100 according to the preparation type quantum key transmission method is described below.

The identification unit 110 performs a function of identifying information on the number of quantum keys of the quantum-secured network.

More specifically, when quantum key management system nodes located in the quantum key management network layer of the quantum-secured network are indexed, the identification unit 110 identifies information on the number of adjacent quantum keys between the indexed quantum key management system nodes.

In connection with this, it may be assumed that the total number of quantum key management system nodes located in the quantum key management network layer is N.

In this case, the identification unit 110 first indexes quantum key management system nodes 1 to N of the network and generate a quantum key information matrix G to store information on the number of quantum keys between the indexed quantum key management system nodes.

A predetermined element G (i, j) of the matrix indicates the number of adjacent quantum keys between a quantum key management system node i and a quantum key management system node j.

Since the quantum key has bidirectionality, G is a symmetric matrix and, that is, G(i, j) and G(j, i) have the same value.

Accordingly, when the total number of quantum key management system nodes is N, the size of G is N×N.

Meanwhile, the identification unit 110 may identify not only the information on the number of quantum keys for the quantum-secured network but also network information.

Here, the network may include at least one of network topology information of the network, a quantum key generation rate, and a service key request rate.

For reference, the network information is a variable which should be considered for searching for a node path and may be understood to reflect physical network information of the quantum-secured network, whether there is network failure, and a degree of a quantum key request and a degree of a service key between pairs of nodes.

The search unit 120 performs a function of selecting node paths corresponding to the sequence of quantum key management system nodes.

More specifically, the search unit 120 searches for node paths corresponding to the sequence of quantum key management system nodes for reproducing adjacent quantum keys in order to generate non-adjacent quantum keys between quantum key management system nodes designated as a start node (s) and a destination node (d) in the quantum-secured network.

At this time, the search unit 120 may search for a specific node path in which the number of adjacent quantum keys between an intermediate node (m) and the destination node (d) is larger than the number of adjacent quantum keys between the start node (s) and the destination node (d) and the difference between the numbers is the largest among node paths designated as the start node (s), the destination node (d), and the intermediate node (m) between the start node (s) and the destination node (d).

The process may be expressed as shown in [Equation 2] below.

$$s^*, d^*, m^* = \arg\max_{s,d,m}[G(m, d) - G(s, d)] \quad \text{[Equation 2]}$$

This may be understood as an equation for calculating the start node (s), the intermediate node (m), and the destination node (d) in which the number of adjacent quantum keys between the start node (s) and the destination node (d) is relatively small and the number of adjacent quantum keys between the intermediate node (m) and the destination node (d) is relatively large.

Meanwhile, when not only the information on the number of quantum keys but also the network information is identified from the quantum-secured network, the search unit 120 may additionally reflect physical network information of the quantum-secured network, whether there is network failure, and a degree of a quantum key request and a degree of a service key request between pairs of nodes from the network information.

The controller 130 performs a function of controlling the generation of quantum keys.

More specifically, when a specific node path in which the number of adjacent quantum keys between the intermediate node (m) and the destination node (d) is larger than the number of adjacent quantum keys between the start node (s) and the destination node (d) and the difference between the numbers is largest is selected, the controller 130 controls the generation of quantum keys only when the selected node path satisfies a configuration condition for the number of quantum keys.

At this time, only when the number of adjacent quantum keys between the destination node (d) and the intermediate node (m) is larger than a sum of the number of adjacent quantum keys between the start node (s) and the destination node (d) and a third threshold number (Thr3) and the number of adjacent quantum keys between the intermediate node (m) and the destination node (d) is larger than a sum of the number of adjacent quantum keys between the start node (s) and the destination node(d) and a fourth threshold number (Thr4), the controller 130 may consume one adjacent quantum key between the start node (s) and the intermediate node (m) and one adjacent quantum key between the intermediate node (m) and the destination node (d) to generate a non-adjacent quantum key between the start node (s) and the destination node (d).

Meanwhile, when the quantum keys are consumed to generate the non-adjacent quantum key between the start node (s) and the destination node (d), a process of updating information on the consumed quantum keys to the quantum key information matrix G and then selecting the start node (s), the intermediate node (m), and the destination node (d) to generate a new quantum key may be repeated until an end condition is satisfied.

The end condition may be understood as the case in which a comparison condition based on the third threshold number (Thr3) and the fourth threshold number (Thr4) is not satisfied.

Further, as described above, the third threshold number (Thr3) and the fourth threshold number (Thr4) which are the comparison reference for generating the quantum keys are for system safety, and when there are sufficient quantum keys available in the corresponding interval of the node paths, a value there of may be configured to be large.

As described above, according to the configuration of the quantum key management device 100 according to an embodiment of the disclosure, it is possible to efficiently and effectively generate service keys in a limited quantum key resource condition by transmitting and reproducing quantum keys with reference to only information on neighbor nodes of a specific node without reference to quantum key resource information of all nodes during a quantum key relay process, thereby achieving a network service at a very high security level.

Figure 3:
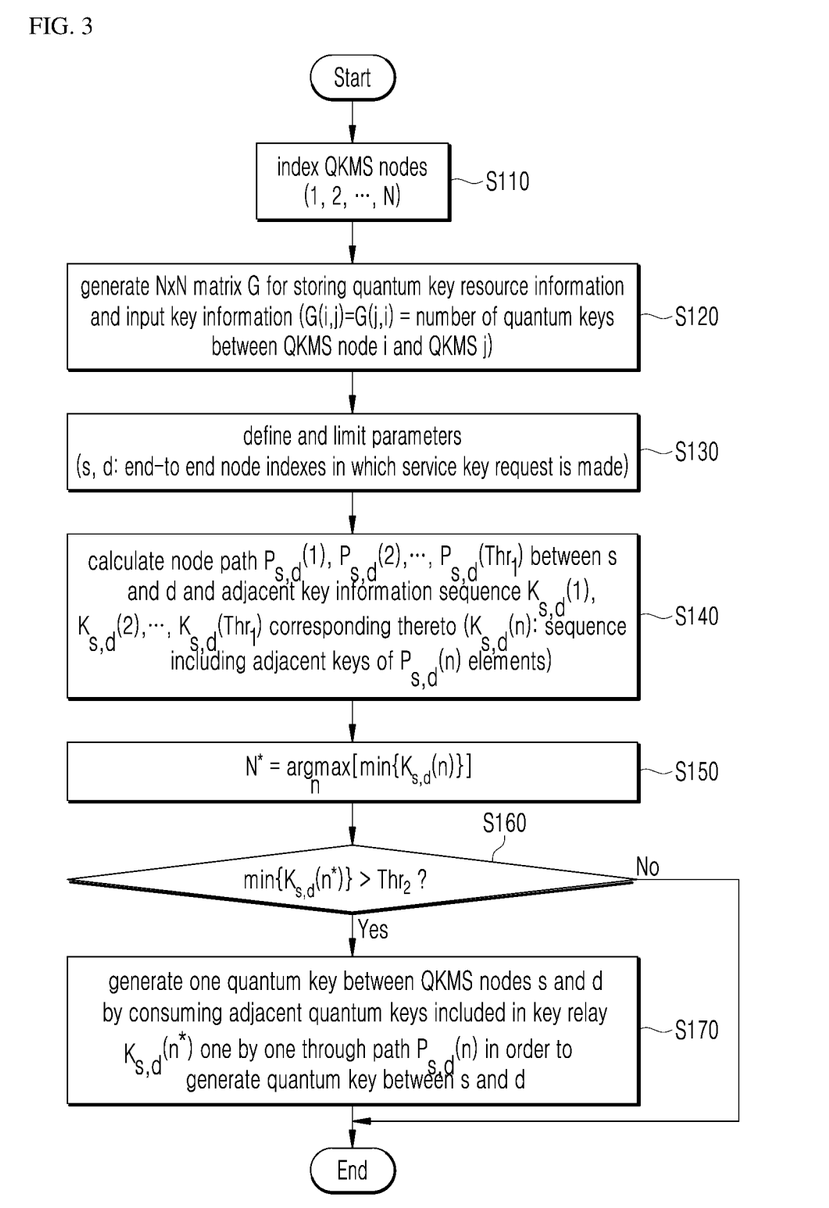
FIG. 3 is a flowchart illustrating a method of operating the quantum key management device in a response type quantum key transmission method according to an embodiment of the disclosure.

Hereinafter, a method of operating the quantum key management device 100 according to the response type quantum key transmission method is described with reference to FIG. 3

First, when quantum key management system nodes located in the quantum key management network layer of the quantum-secured network are indexed, the identification unit 110 identifies information on the number of adjacent quantum keys between the indexed quantum key management system nodes in S110 to S120.

In connection with this, it may be assumed that the total number of quantum key management system nodes located in the quantum key management network layer is N.

In this case, the identification unit 110 first indexes quantum key management system nodes 1 to N of the network and generate a quantum key information matrix G to store information on the number of quantum keys between the indexed quantum key management system nodes.

A predetermined element G (i, j) of the matrix indicates the number of adjacent quantum keys between a quantum key management system node i and a quantum key management system node j.

Since the quantum key has bidirectionality, G is a symmetric matrix and, that is, G(i, j) and G(j, i) have the same value.

Accordingly, when the total number of quantum key management system nodes is N, the size of G is N×N.

Meanwhile, the identification unit 110 may identify not only the information on the number of quantum keys for the quantum-secured network but also network information.

Here, the network may include at least one of network topology information of the network, a quantum key generation rate, and a service key request rate.

For reference, the network information is a variable which should be considered for searching for a node path and may be understood to reflect physical network information of the quantum-secured network, whether there is network failure, and a degree of a quantum key request and a degree of a service key between pairs of nodes.

Then, the search unit 120 searches for node paths corresponding to arrangement of quantum key management system nodes for reproducing adjacent quantum keys in order to generate non-adjacent quantum keys between quantum key management system nodes designated as a start node (s) and a destination node (d) in the quantum-secured network in S130 to S140.

At this time, when the start node (s) and the destination node (d) are designated according to a service request in the quantum-secured network, the search unit 120 may search for node paths between the start node (s) and the destination node (d) as many as a first threshold number (Thr1).

Each of the found node paths is configured by the sequence of nodes starting at the start node (s) and ending at the destination node (d), and consecutive nodes within the sequence are adjacent nodes in the physical network and thus may match adjacent key information sequence corresponding to each thereof.

For example, when an nth node path $P_{s,d}$ between the start node (s) and the destination node (d) is found as {s, b, c, d}, an adjacent key information sequence $K_{s,d}(n)$ corresponding to the node path may be calculated (identified) as {G(s,b), G(b,c), G(c,d)}.

Meanwhile, when not only the information on the number of quantum keys but also the network information is identified from the quantum-secured network, the search unit 120 may additionally reflect physical network information of the quantum-secured network, whether there is network failure, and a degree of a quantum key request and a degree of a service key request between pairs of nodes from the network information.

Thereafter, when as many node paths between the start node (s) and the destination node (d) as the first threshold number (Thr1) are found, the controller 130 selects a specific node path required to generate an adjacent quantum key from among the found node paths and control the generation of the quantum keys in S150 to S170.

In connection with this, from among the found node paths corresponding to the first threshold number (Thr1), the controller 130 selects a specific node in which the number of adjacent quantum keys identified as the minimum value is largest in each node and the number of adjacent quantum keys identified as the minimum value is larger than the second threshold number (Thr2).

In connection with [Equation 1] above, when a value of min{$K_{s,d}(n^*)$} is larger than the second threshold number (Thr2), a non-adjacent quantum key between the start node (s) and the destination node (d) is relayed through node paths belonging to $P_{s,d}(n^*)$.

That is, it is possible to generate one non-adjacent key between the start node (s) and the destination node (d) by consuming adjacent quantum keys included in $K_{s,d}(n^*)$ one by one.

Meanwhile, the first threshold number (Thr1) which is the search reference of node paths is related to the system performance, and when a value thereof is configured to be small, the system load due to the search for node paths may be reduced and thus the system performance can be improved. The second threshold number (Thr2) which is the selection reference of node paths is related to the system safety, and when there are sufficient quantum keys available in the node paths, a value thereof may be configured to be large.

Figure 4:
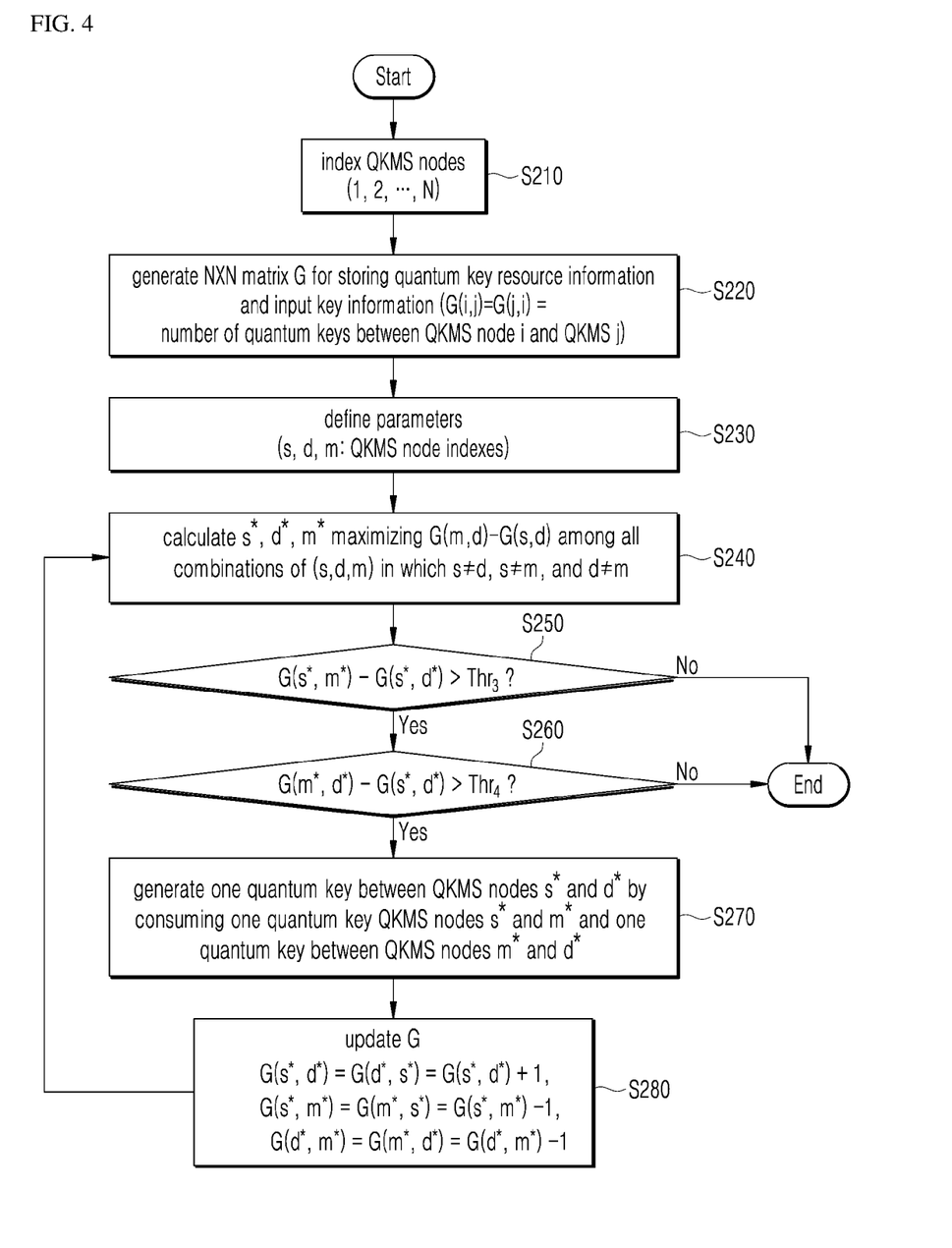
FIG. 4 is a flowchart illustrating a method of operating the quantum key management device in a preparation type quantum key transmission method according to an embodiment of the disclosure.

Hereinafter, a method of operating the quantum key management device 100 according to the preparation type quantum key transmission method is described with reference to FIG. 4.

First, when quantum key management system nodes located in the quantum key management network layer of the quantum-secured network are indexed, the identification unit 110 identifies information on the number of adjacent quantum keys between the indexed quantum key management system nodes in S210 to S220.

In connection with this, it may be assumed that the total number of quantum key management system nodes located in the quantum key management network layer is N.

In this case, the identification unit 110 first indexes quantum key management system nodes 1 to N of the network and generate a quantum key information matrix G to store information on the number of quantum keys between the indexed quantum key management system nodes.

A predetermined element G (i, j) of the matrix indicates the number of adjacent quantum keys between a quantum key management system node i and a quantum key management system node j.

Since the quantum key has bidirectionality, G is a symmetric matrix and, that is, G(i, j) and G(j, i) have the same value.

Accordingly, when the total number of quantum key management system nodes is N, the size of G is N×N.

Meanwhile, the identification unit 110 may identify not only the information on the number of quantum keys for the quantum-secured network but also network information.

Here, the network may include at least one of network topology information of the network, a quantum key generation rate, and a service key request rate.

For reference, the network information is a variable which should be considered for searching for a node path and may be understood to reflect physical network information of the quantum-secured network, whether there is network failure, and a degree of a quantum key request and a degree of a service key between pairs of nodes.

Then, the search unit 120 searches for node paths corresponding to arrangement of quantum key management system nodes for reproducing adjacent quantum keys in order to generate non-adjacent quantum keys between quantum key management system nodes designated as a start node (s) and a destination node (d) in the quantum-secured network in S230 to S240.

At this time, the search unit 120 may search for a specific node path in which the number of adjacent quantum keys between an intermediate node (m) and the destination node (d) is larger than the number of adjacent quantum keys between the start node (s) and the destination node (d) and the difference between the numbers is the largest among node paths designated as the start node (s), the destination node (d), and the intermediate node (m) between the start node (s) and the destination node (d).

The process may be expressed as shown in [Equation 2] above, which may be understood to calculate the start node (s), the intermediate node (m), and the destination node (d) in which the number of adjacent quantum keys between the start node (s) and the destination node (d) is relatively small and the number of adjacent quantum keys between the intermediate node (m) and the destination node (d) is relatively large.

Meanwhile, when not only the information on the number of quantum keys but also the network information is identified from the quantum-secured network, the search unit 120 may additionally reflect physical network information of the quantum-secured network, whether there is network failure, and a degree of a quantum key request and a degree of a service key request between pairs of nodes from the network information.

Thereafter, when a specific node path in which the number of adjacent quantum keys between the intermediate node (m) and the destination node (d) is larger than the number of adjacent quantum keys between the start node (s) and the destination node (d) and the difference between the numbers is largest is selected, the controller 130 controls the generation of quantum keys only when the selected node path satisfies a configuration condition for the number of quantum keys in S250 to S280.

At this time, only when the number of adjacent quantum keys between the destination node (d) and the intermediate node (m) is larger than a sum of the number of adjacent quantum keys between the start node (s) and the destination node (d) and a third threshold number (Thr3) and the number of adjacent quantum keys between the intermediate node (m) and the destination node (d) is larger than a sum of the number of adjacent quantum keys between the start node (s) and the destination node (d) and a fourth threshold number (Thr4), the controller 130 may consume one adjacent quantum key between the start node (s) and the intermediate node (m) and one adjacent quantum key between the intermediate node (m) and the destination node (d) to generate a non-adjacent quantum key between the start node (s) and the destination node (d).

Meanwhile, when the quantum keys are consumed to generate the non-adjacent quantum key between the start node (s) and the destination node (d), a process of updating information on the consumed quantum keys to the quantum key information matrix G and then selecting the start node (s), the intermediate node (m), and the destination node (d) to generate a new quantum key may be repeated until an end condition is satisfied.

The end condition may be understood as the case in which a comparison condition based on the third threshold number (Thr3) and the fourth threshold number (Thr4) is not satisfied.

Further, as described above, the third threshold number (Thr3) and the fourth threshold number (Thr4) which are the comparison reference for generating the quantum keys are for system safety, and when there are sufficient quantum keys available in the corresponding interval of the node paths, a value there of may be configured to be large.

As described above, according to the configuration of the quantum key management device 100 according to an embodiment of the disclosure, it is possible to efficiently and effectively generate service keys in a limited quantum key resource condition by transmitting and reproducing quantum keys with reference to only information on neighbor nodes of a specific node without reference to quantum key resource information of all nodes during a quantum key relay process, thereby achieving a network service at a very high security level.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

The invention claimed is:

1. An apparatus for managing quantum keys, the apparatus comprising:
an identification unit configured to, when quantum key management system nodes located in a quantum key management network layer of a quantum-secured network are indexed, identify information on a number of quantum keys between the indexed quantum key management system nodes;
a search unit configured to search for node paths corresponding to sequence of quantum key management system nodes for reproducing adjacent quantum keys in order to generate a non-adjacent quantum key between quantum key management system nodes designated as a start node and a destination node in the quantum-secured network, based on the information on the number of quantum keys, wherein the search unit is configured to, when the start node and the destination node are designated according to a service request in the quantum-secured network, search for as many node paths between the start node and the destination node as a first threshold number; and
a controller configured to perform control to generate a non-adjacent quantum key through a specific node path in which a number of adjacent quantum keys identified as a minimum value is largest and the number of adjacent quantum keys identified as the minimum value is larger than a second threshold number among the searched node paths corresponding to the first threshold number.

2. The apparatus of claim 1, wherein the identification unit is configured to further identify network information comprising at least one of network topology information of the quantum-secured network, a quantum key generation rate, and a service key request rate, and the search unit is configured to search for node paths, based on the information on the number of quantum keys and the network information.

3. An apparatus for managing quantum keys, the apparatus comprising:
an identification unit configured to, when quantum key management system nodes located in a quantum key management network layer of a quantum-secured network are indexed, identify information on a number of quantum keys between the indexed quantum key management system nodes;
a search unit configured to search for node paths corresponding to sequence of quantum key management system nodes for reproducing adjacent quantum keys in order to generate a non-adjacent quantum key between quantum key management system nodes designated as a start node and a destination node in the quantum-secured network, based on the information on the number of quantum keys, wherein the search unit is configured to, when a non-adjacent quantum key is generated in advance before a service request in the quantum-secured network, search for a specific node path in which a number of adjacent quantum keys between an intermediate node and the destination node is larger than a number of adjacent quantum keys between the start node and the destination node and a difference between the numbers is largest among path nodes designated for the start node, the destination node, and the intermediate node between the start node and the destination node.

4. The apparatus of claim 3, further comprising a controller configured to perform control to consume one adjacent quantum key between the start node and the intermediate node and one adjacent quantum key between the intermediate node and the destination node to generate a non-adjacent quantum key between the start node and the destination node in at least one case in which the number of adjacent quantum keys between the destination node and the intermediate node is larger than a sum of the number of adjacent quantum keys between the start node and the destination node and a third threshold number and the number of adjacent quantum keys between the intermediate node and the destination node is larger than a sum of the number of adjacent quantum keys between the start node and the destination node and a fourth threshold number.

5. The apparatus of claim 3, wherein the search unit is configured to search for as many node paths between the start node and the destination node as a first threshold number.

6. The apparatus of claim 5, further comprising a controller configured to perform control to generate a non-adjacent quantum key through a specific node path in which a number of adjacent quantum keys identified as a minimum value is largest and the number of adjacent quantum keys identified as the minimum value is larger than a second threshold number among the searched node paths corresponding to the first threshold number.

7. A method of operating a quantum key management device, the method comprising:
an identification operation of, when quantum key management system nodes located in a quantum key management network layer of a quantum-secured network are indexed, identifying information on a number of quantum keys between the indexed quantum key management system nodes; and
a search operation of searching for node paths corresponding to sequence of quantum key management system nodes for reproducing adjacent quantum keys in order to generate a non-adjacent quantum key between quantum key management system nodes designated as a start node and a destination node in the quantum-secured network, based on the information on the number of quantum keys, wherein the search operation comprises, when the start node and the destination node are designated according to a service request in the quantum-secured network, searching for as many node paths between the start node and the destination node as a first threshold number; and
a control operation of performing control to generate a non-adjacent quantum key through a specific node path in which a number of adjacent quantum keys identified as a minimum value is largest and the number of adjacent quantum keys identified as the minimum value is larger than a second threshold number among the searched node paths corresponding to the first threshold number.

8. The method of claim 7, wherein the identification operation comprises further identifying network information comprising at least one of network topology information of the quantum-secured network, a quantum key generation rate, and a service key request rate, and the search operation comprises searching for node paths, based on the information on the number of quantum keys and the network information.

9. The method of claim 7, wherein the search operation comprises, when a non-adjacent quantum key is generated in advance before a service request in the quantum-secured network, searching for a specific node path in which a number of adjacent quantum keys between an intermediate node and the destination node is larger than a number of adjacent quantum keys between the start node and the destination node and a difference between the numbers is largest among path nodes designated for the start node, the destination node, and the intermediate node between the start node and the destination node.

10. The method of claim 9, wherein the control operation includes performing control to consume one adjacent quantum key between the start node and the intermediate node and one adjacent quantum key between the intermediate node and the destination node to generate a non-adjacent quantum key between the start node and the destination node in at least one case in which the number of adjacent quantum keys between the destination node and the intermediate node is larger than a sum of the number of adjacent quantum keys between the start node and the destination node and a third threshold number and the number of adjacent quantum keys between the intermediate node and the destination node is larger than a sum of the number of adjacent quantum keys between the start node and the destination node and a fourth threshold number.

* * * * *